US011208360B2

United States Patent
Chia et al.

(10) Patent No.: US 11,208,360 B2
(45) Date of Patent: Dec. 28, 2021

(54) IRON-SUPPLEMENTED FERTILIZER

(71) Applicant: OMS INVESTMENTS, INC., Los Angeles, CA (US)

(72) Inventors: James Liang-Hiong Chia, Columbus, OH (US); John Koenig, Marysville, OH (US)

(73) Assignee: OMS INVESTMENTS, INC., Los Angeles, CA (US)

( * ) Notice: Subject to any disclaimer, the term of this patent is extended or adjusted under 35 U.S.C. 154(b) by 30 days.

(21) Appl. No.: 16/083,660

(22) PCT Filed: Mar. 10, 2017

(86) PCT No.: PCT/US2017/021920
§ 371 (c)(1),
(2) Date: Sep. 10, 2018

(87) PCT Pub. No.: WO2017/156464
PCT Pub. Date: Sep. 14, 2017

(65) Prior Publication Data
US 2019/0135710 A1 May 9, 2019

Related U.S. Application Data

(60) Provisional application No. 62/306,721, filed on Mar. 11, 2016.

(51) Int. Cl.
| | | |
|---|---|---|
| C05G 1/00 | (2006.01) |
| C05C 11/00 | (2006.01) |
| C05C 9/00 | (2006.01) |
| C05D 9/00 | (2006.01) |
| C05D 9/02 | (2006.01) |
| C05G 3/00 | (2020.01) |
| C05C 9/02 | (2006.01) |
| C05C 3/00 | (2006.01) |
| C05C 5/00 | (2006.01) |
| C05G 5/23 | (2020.01) |
| C05C 1/00 | (2006.01) |
| C05F 11/00 | (2006.01) |
| A01C 15/02 | (2006.01) |
| A01C 21/00 | (2006.01) |

(52) U.S. Cl.
CPC .................. *C05G 1/00* (2013.01); *C05C 1/00* (2013.01); *C05C 3/00* (2013.01); *C05C 5/00* (2013.01); *C05C 9/00* (2013.01); *C05C 9/02* (2013.01); *C05C 11/00* (2013.01); *C05D 9/00* (2013.01); *C05D 9/02* (2013.01); *C05F 11/00* (2013.01); *C05G 3/00* (2013.01); *C05G 5/23* (2020.02); *A01C 15/02* (2013.01); *A01C 21/00* (2013.01); *Y02P 60/21* (2015.11)

(58) Field of Classification Search
None
See application file for complete search history.

(56) References Cited

U.S. PATENT DOCUMENTS

| 10,508,060 | B1 * | 12/2019 | Roach | C05B 11/10 |
| 2006/0014645 | A1 * | 1/2006 | Yavitz | C05F 11/10 |
| | | | | 504/241 |
| 2009/0270257 | A1 | 10/2009 | Pursell et al. | |
| 2018/0179116 | A1 * | 6/2018 | Roach | C05C 3/00 |

FOREIGN PATENT DOCUMENTS

| CA | 1258189 A | 8/1989 |
| CN | 105884508 A | 11/2015 |
| CN | 105060986 A | 8/2016 |

OTHER PUBLICATIONS

International Search Report and Written Opinion of the International Searching Authority for International Patent Application No. PCT/US17/21920, dated Jun. 12, 2017 (9 pages).
Liu, "Controlled-Release and Slow-Release Fertilizers as Nutrient Management Tools," UF/IFAS Extension, Oct. 2014 (7 pages).

* cited by examiner

*Primary Examiner* — Wayne A Langel
(74) *Attorney, Agent, or Firm* — Ulmer & Berne LLP

(57) ABSTRACT

Compositions of a slow-release nitrogen-containing fertilizer and iron chelated to an aminopolycarboxylic acid or a polycarboxylic acid. The composition can be useful as a fertilizer for rapid greening of turfgrass.

19 Claims, No Drawings

IRON-SUPPLEMENTED FERTILIZER

REFERENCE TO RELATED APPLICATIONS

The present application is a national stage application under 35 U.S.C. § 371 of International Application No. PCT/US17/21920, filed Mar. 10, 2017, which claims the priority benefit of U.S. provisional application Ser. No. 62/306,721, filed Mar. 11, 2016, both entitled IRON-SUPPLEMENTED FERTILIZER, and hereby incorporates the same applications herein by reference in their entireties.

TECHNICAL FIELD

The present disclosure relates generally to fertilizers including slow-release nitrogen and iron, and to methods of use thereof.

BACKGROUND

It is a growing trend for state regulations to require fertilizer compositions to include a slow-release nitrogen-containing fertilizer. The inclusion of such slow-release nitrogen-containing fertilizers can cause a number of drawbacks, however, when formulating fertilizer compositions for specific plant species such as turfgrass. For example, fertilizers including slow-release nitrogen-containing fertilizers can be difficult to formulate for plant species which further require iron. It would be desirable to provide a fertilizer composition which can include both a slow-release nitrogen-containing fertilizer and iron.

SUMMARY

According to one embodiment, a liquid fertilizer composition includes a slow-release nitrogen-containing fertilizer and iron chelated to an aminopolycarboxylic acid or a polycarboxylic acid.

According to another embodiment, a method of greening turfgrass includes supplying a liquid fertilizer composition and applying the liquid fertilizer composition to turfgrass to cause greening in about 3 days or less. The liquid fertilizer composition includes a slow-release nitrogen-containing fertilizer and iron chelated to an aminopolycarboxylic acid or a polycarboxylic acid. Greening is an increase in the dark green color index (DGCI) value of the turfgrass as compared to turfgrass not treated with the liquid fertilizer composition.

DETAILED DESCRIPTION

The present disclosure generally describes liquid fertilizer compositions which can be useful as fertilizer for plants, such as monocots (e.g., turfgrass). Generally, the liquid fertilizer compositions can include slow-release nitrogen-containing fertilizer that provides nitrogen to plants as well as a chelated iron source. In certain embodiments, the described compositions can include a slow-release nitrogen-containing fertilizer and a chelated iron (III) (i.e., iron in its ferric form) compound. For example, the iron (III) can be chelated to an aminopolycarboxylic acid or a polycarboxylic acid in certain embodiments.

As used herein, the term "slow-release nitrogen-containing fertilizer" means a fertilizer that provides a slower and/or longer duration release of nitrogen to plants after application than a "fast-release nitrogen-containing fertilizer." Examples of slow-release fertilizers are known in the art. See, e.g., Liu et al, "Controlled-Release and Slow-Release Fertilizers as Nutrient Management Tools", (October 2014), available at http://edis.ifas.ufl.edu/hs1255, the disclosure of which is hereby incorporated by reference.

As can be appreciated, the extended release of nitrogen, or the delay of its initial availability, can occur through a variety of mechanisms. For example, slow-release nitrogen-containing fertilizers can have controlled water solubility through the inclusion of semi-permeable coatings, occlusion, or through the formation of the fertilizer from water insoluble polymers, natural nitrogenous organics, protein materials, or other chemicals. Alternatively, slow-release nitrogen-containing fertilizers can be materials which are slow to hydrolyze in water such as certain low-molecular weight compounds. As can be appreciated however, any mechanism which provides for the slow release of nitrogen can also be suitable for the liquid fertilizer compositions described herein. Generally, a slow-release nitrogen-containing fertilizer can make nitrogen available to plants over a period of weeks to months.

Various types of slow-release nitrogen-containing fertilizers can be suitable for use in the liquid fertilizer compositions described herein. For example, suitable slow-release nitrogen-containing fertilizers can include triazones, urea-triazones (such as tetrahydro-s-triazone or 5-methyleneuriedo-2-oxohexahydro-s-triazine), urea containing fertilizer compositions (e.g., urea fertilizers or urea formaldehyde reaction product fertilizers such as urea-formaldehyde fertilizer or methylene urea fertilizers), and isobutylidenediurea (IBDU). As can be appreciated, the liquid fertilizer compositions described herein can include one or more slow-release nitrogen-containing fertilizers. The use of multiple slow-release nitrogen-containing fertilizers, for example, can allow for the controlled release of nitrogen over predetermined amounts of time.

In certain embodiments, the slow-release nitrogen-containing fertilizer can be water-soluble. In certain embodiments, the slow-release nitrogen-containing fertilizer can be urea-triazone.

The slow-release nitrogen-containing fertilizer can include any suitable amount of nitrogen. For example, in certain embodiments, the slow-release nitrogen-containing fertilizer can include from about 1% to about 99%, by weight, nitrogen. In certain embodiments, the slow-release nitrogen-containing fertilizer can include from about 20% to about 70%, by weight, nitrogen including, for example, from about 20% to about 50%, by weight, nitrogen. In various embodiments, the amount, by weight, nitrogen in a slow-release nitrogen-containing fertilizer can be about 1%, about 2%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 99%.

In certain embodiments, the slow-release nitrogen-containing fertilizer can include, by weight, about 1% or more, about 2% or more, about 3% or more, about 4% or more, about 5% or more, about 6% or more, about 7.5% or more, about 10% or more, about 15% or more, about 20% or more, about 25% or more, about 30% or more, about 40% or more, about 45% or more, about 50% or more, about 55% or more, about 60% or more, about 65% or more, about 70% or more, about 75% or more, about 80% or more, about 85% or more, about 90% or more, or about 95% or more, nitrogen.

In addition to nitrogen, the liquid fertilizer compositions described herein can also include iron. The addition of iron to the liquid fertilizer compositions can promote rapid greening of turfgrass. As can be appreciated however, slow-release nitrogen-containing fertilizers such as urea-triazone are generally alkaline in nature while iron compounds such as iron (II) and iron (III) are generally insoluble under high, or alkaline, pH conditions. The differing pH requirements of the slow-release nitrogen-containing fertilizers and iron can increase the difficulty of formulating a liquid fertilizer composition which includes both components. In particular, urea-triazones can produce alkaline solutions which can cause iron (III) to precipitate out of solution. Applicant has discovered that a liquid fertilizer composition including both a slow-release nitrogen-containing fertilizer and iron can be formulated by including iron chelated to a suitable polymeric species.

For example, in certain embodiments, the liquid fertilizer compositions can include iron (III) (i.e., iron in its ferric form) that is chelated to an aminopolycarboxylic acid or a polycarboxylic acid. Specific examples of aminopolycarboxylic acids that iron can be chelated to and included in the liquid fertilizer compositions described herein can include ethylenediamine tetraacetic acid (EDTA); diethylenetriamine pentaacetic acid (DTPA); N-(2-hydroxyethyl)ethylenediamine triacetic acid (HEDTA); cyclohexane-1,2-diamine tetraacetic acid (CDTA); ethylenediamine-N,N'-bis (o-hydroxyphenylacetic) acid (EDDHA); ethylenediamine-N-(o-hydroxyphenylacetic)-N'-(p-hydroxyphenylacetic) acid (o,p-EDDHA); ethylenediamine-N,N'-bis(2-hydroxy-4-methylphenylacetic) acid (EDDHMA); ethylenediamine-N,N'-bis(5-carboxy-2-hydroxyphenylacetic) acid (EDDCHA); ethylenediamine-N,N'-bis (2-hydroxy-5-sulfophenylacetic) acid (EDDHSA); N,N'-bis (2-hydroxyphenyl)ethylendiamine-N,N'-diacetic acid (HBED); and ethylenediamine-N,N'-disuccinic acid (EDDS). Specific examples of polycarboxylic acids that iron can be chelated to and included in the liquid fertilizer compositions described herein can include citric acid, oxalic acid, succinic acid, malonic acid, and tartaric acid. As can be appreciated, the liquid fertilizer compositions can include one or more iron chelated aminopolycarboxylic acids, iron chelated polycarboxylic acids, or a combination thereof.

In certain embodiments, the liquid fertilizer compositions can include any suitable amount of iron. For example, in certain embodiments, the amount of elemental iron in the compositions can range from about 0.1% to about 10% by weight. For example, the amount of iron in the described liquid fertilizer compositions can be about 0.1%, about 0.2%, about 0.3%, about 0.4%, about 0.5%, about 0.6%, about 0.7%, about 0.8%, about 0.9%, about 1%, about 1.5%, about 2.0%, about 2.5%, about 3.0%, about 3.5%, about 4.0%, about 4.5%, about 5.0%, about 5.5%, about 6.0%, about 6.5%, about 7.0%, about 7.5%, about 8.0%, about 8.5%, about 9.0%, about 9.5%, or about 10% by weight. In certain embodiments, the amount of iron in a liquid fertilizer composition can be, by weight, less than about 0.1%, less than about 0.2%, less than about 0.3%, less than about 0.4%, less than about 0.5%, less than about 0.6%, less than about 0.7%, less than about 0.8%, less than about 0.9%, less than about 1%, less than about 1.5%, less than about 2.0%, less than about 2.5%, less than about 3.0%, less than about 3.5%, less than about 4.0%, less than about 4.5%, less than about 5.0%, less than about 5.5%, less than about 6.0%, less than about 6.5%, less than about 7.0%, less than about 7.5%, less than about 8.0%, less than about 8.5%, less than about 9.0%, less than about 9.5%, or less than about 10%.

In certain embodiments, the amount of an iron-chelated compound included in the liquid fertilizer compositions can range from about 1% to about 40% by weight of the composition. For example, the amount of iron-chelated compounds in a liquid fertilizer composition described herein can be, by weight, about 1%, about 2%, about 3%, about 4%, about 5%, about 6%, about 7%, about 8%, about 9%, about 10%, about 15%, about 20%, about 25%, about 30%, about 35%, or about 40% of the composition. In certain embodiments, the amount of iron-chelated compounds in a liquid fertilizer composition can be, by weight, less than about 1%, less than about 2%, less than about 3%, less than about 4%, less than about 5%, less than about 6%, less than about 7%, less than about 8%, less than about 9%, less than about 10%, less than about 15%, less than about 20%, less than about 25%, less than about 30%, less than about 35%, or less than about 40% of the composition.

In certain embodiments, the pH of the liquid fertilizer compositions can be selected to provide compatibility between the slow-release nitrogen-containing fertilizer and the iron-chelated compound. For example, in certain embodiments, the pH of the liquid fertilizer composition can be in the range of about 7.5 to about 9.5; and in certain embodiments, in the range of about 7 to about 10. In certain embodiments, the pH of the composition can be about 7.5, about 8.0, about 8.5, about 9.0, or about 9.5.

In certain embodiments, the described liquid fertilizer compositions can further include a fast-release nitrogen-containing fertilizer. As used herein, the term "fast-release nitrogen-containing fertilizer" means a fertilizer that provides rapid availability of nitrogen to plants after application due to the nitrogen's solubility in water (i.e., the fertilizer provides "water-soluble nitrogen"). A fast-release nitrogen-containing fertilizer differs from the slow-release nitrogen-containing fertilizer in one or more characteristics, such as the hydrophobicity of the nitrogen compound, the molecular weight of the nitrogen compound, the water solubility of the nitrogen compound, the presence of additive materials in the fertilizer, and/or the particle size of the fertilizer.

Various types of fast-release nitrogen-containing fertilizers can be suitable for use in the described liquid fertilizer compositions including urea, urea ammonium nitrate (UAN), ammonium, nitrate, or a combination thereof. As can be appreciated, a liquid fertilizer composition can also include more than one fast-release nitrogen-containing fertilizers.

A fast-release nitrogen-containing fertilizer can include any suitable amount of nitrogen. In certain embodiments, a fast-release nitrogen-containing fertilizer can include from about 1% to about 99%, by weight, nitrogen. In certain embodiments, a fast-release nitrogen-containing fertilizer can include from about 20% to about 50%, by weight, nitrogen. For example, the amount, by weight, of nitrogen in a fast-release nitrogen-containing fertilizer can be about 1%, about 2%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 99%.

In certain embodiments, a fast-release nitrogen-containing fertilizer can include, by weight, at least about 1%, at least about 2%, at least about 3%, at least about 4%, at least about 5%, at least about 10%, at least about 7.5%, at least about 12.5%, at least about 15%, at least about 20%, at least about 25%, at least about 30%, at least about 40%, at least about 45%, at least about 50%, at least about 55%, at least about 60%, at least about 65%, at least about 70%, at least about 75%, at least about 80%, at least about 85%, at least about 90%, or at least about 95% nitrogen.

The liquid fertilizer compositions described herein can further include or more additional components, such as phosphorus, potassium, calcium, magnesium, manganese, molybdenum, sulfur, and/or zinc.

In certain embodiments, the liquid fertilizer compositions can exhibit unexpected results. For example, liquid fertilizer compositions including iron (III) chelated to an aminopolycarboxylic acid with six or more coordination bonds (e.g., ferric-DTPA), a slow release fertilizer (e.g., urea-triazone), and a fast-release fertilizer (e.g., urea ammonium nitrate) were found to be much more stable and robust as compared to the compositions comprising iron (III) chelated to an aminopolycarboxylic acid with six or less coordination bonds (e.g., ferric-ETPA), a slow release fertilizer (e.g., urea-triazone), and a fast-release fertilizer (e.g., urea ammonium nitrate) under the same testing conditions (e.g., at elevated temperatures of 104° F.). As can be appreciated, elevated temperature testing demonstrates long-term storage stability as liquid fertilizer products will likely be stored in an outdoor environment, or other environment that is not temperature regulated.

In certain embodiments, the liquid fertilizer compositions described herein can be applied to a seed, seedling, plant, or lawn. In certain embodiments, the seed, seedling, plant, or lawn can include turfgrass. Examples of treatable turfgrasses can include Annual Bluegrass, Hybrid Bermudagrass, Rough Bluegrass, Seashore Paspalum, Goosegrass, Orchardgrass, Poa annua, Sandbur, Povertygrass, Crabgrass, Chess, Downy Chess, Timothy, Green Foxtail, Stinkgrass, Witchgrass, Yellow Foxtail, Barnyard grass, Canada Bluegrass, Fowl Bluegrass, Kentucky Bluegrass, Poa trivialis, Fine Fescue, Perennial Ryegrass, Annual Ryegrass, Colonial Bentgrass, Creeping Bentgrass, Quackgrass, Redtop, Reed Canarygrass, Smooth Brome, Smooth Crabgrass, Tall Fescue, Wild Barley, Bahiagrass, Broomsedge, Centipedegrass, Carpetgrass, Signalgrass, St. Augustinegrass, Bull Paspalum, Dallisgrass, Field Paspalum, Egyptian Crabgrass, Johnsongrass, Knotgrass, Rescuegrass, Sudangrass, Bermudagrass, Purpletop, Smutgrass, Zoysiagrass, Sweet Vernalgrass, Nimblewill, Velvetgrass, Fall Panicum, Lovegrass, Foxtail Barley, Windmillgrass, Blue Grama, Kikuyugrass, Saltgrass, Wild Oats, and/or Buffalograss.

The application of any of the liquid fertilizer compositions described herein on a seed, seedling, plant, or lawn can have a rapid greening effect on the seed, seedling, plant, or lawn. In certain embodiments, application of the liquid fertilizer composition to a plant or lawn can result in increasing the green color of the plant or lawn, as measured by visual assessment using DIA (Digital Image Analysis) and/or NTEP (National Turfgrass Evaluation Program), within one day, within two days, within three days, within four days, within five days, within six days, within seven days, within eight days, or within nine days. Examples of suitable methods to perform DIA are disclosed in Douglas E. Karcher and Michael D. Richardson, *TURFGRASS SCIENCE—Quantifying Turfgrass Color Using Digital Image Analysis*, 43 CROP SCIENCE 943-951 (2003), which is hereby incorporated herein by reference.

In certain embodiments, the liquid fertilizer compositions can be sprayed onto a soil, seed, seedling, plant, or lawn using sprayers known to one of ordinary skill in the art, such as trigger sprayers (e.g., hand-held trigger sprayers), wand sprayers, bottle sprayers, compression sprayers, tank sprayers, pump sprayers, hose-end sprayers, and backpack sprayers.

In certain embodiments, a liquid fertilizer composition described herein can be applied in amounts of from about 0.1 lbs of nitrogen per 1000 $ft^2$ to about 6 lbs. of nitrogen per 1000 $ft^2$. In certain embodiments, the liquid fertilizer compositions can be formulated as a ready-to-use or ready-to-spray formulation.

In certain embodiments, the liquid fertilizer compositions can be applied in amounts of from about 0.5 g of iron per 1000 $ft^2$ to about 50 g of iron per 1000 $ft^2$. In certain embodiments, the composition can be formulated as a ready-to-use or ready-to-spray formulation.

In embodiments in which the liquid fertilizer composition is granular, the granular compositions can be applied to a soil, seed, seedling, plant or lawn by sprinkling, or spreading, the composition onto the soil, seed, seedling, plant or lawn.

In certain embodiments, the liquid fertilizer compositions, when applied, can be resistant to precipitation of the iron compound.

The following examples are included to illustrate certain aspects and embodiments of the present disclosure, and are not intended to limit the disclosure to the disclosed embodiments.

EXAMPLES

Example 1

Two different liquid fertilizer compositions, Formulation 1 and Formulation 2, were tested for their greening effect on turfgrass. Both Formulations contained 67%, by weight, urea ammonium nitrate as a fast-release nitrogen-containing fertilizer, 26.6%, by weight, urea-triazone as a slow-release nitrogen-containing fertilizer, and 0.5%, by weight, iron. In Formulation 1, the iron was chelated to DPTA. In Formulation 2, the iron was chelated to EDTA.

Formulations 1 and 2 were compared with several Comparative Formulations. Comparative Formulation 3 included 29% total nitrogen with 20% being slow-release nitrogen. Comparative Formulation 4 was a commercially available turfgrass product including 29% total nitrogen with 17.3% slow-release nitrogen. An unfed control was also evaluated.

Several evaluations were performed. For the first evaluation, the Formulations were applied to *Poaceae* sp., *Lolium* sp., and *Festuca* sp turfgrasses. The color quality of each turfgrass was assessed in two different ways. In the first assessment method, the color of the grass was assessed visually and scored on a 1-9 scale using the standard protocols set by the National Turfgrass Evaluation Program (U.S. Dept. of Agriculture, Beltsville Agricultural Research Center, Beltsville, Md.). On this scale, 1 represents yellow, or brown, turf and 9 represents optimal, dark green turf.

The mean color assessment scores of the visual assessment are depicted in Table 1 (n=56 for each group). Grouping information was observed using Fisher's least significant difference method for pairwise comparisons. Means separated by different letters are significantly different from one another with $p<0.05$.

TABLE 1

| Treatment | Mean | Grouping |
|---|---|---|
| Formulation 1 - 29% Total Nitrogen (20% slow release nitrogen), 0.5% elemental iron (iron chelated to DTPA) | 5.93750 | A |
| Formulation 2 - 29% Total nitrogen (20% slow release nitrogen formula), 0.5% elemental iron (iron chelated to EDTA) | 5.91071 | A |
| Formulation 3 - 29% Total nitrogen (20% slow-release nitrogen) | 5.45536 | B |

TABLE 1-continued

| Treatment | Mean | Grouping |
|---|---|---|
| Formulation 4 - 29% Total nitrogen (17.3% slow-release nitrogen) | 4.98214 | C |
| Unfed control | 4.64286 | D |

For the second assessment method, the color of the turfgrass was measured according to the dark green color index (DGCI) as calculated by digital image analysis of color photos. The mean DGCI values are depicted in Table 2 (n=40 for each group). Grouping information was observed using Fisher's least significant difference method for pairwise comparisons. Means separated by different letters are significantly different from one another with $p<0.05$.

TABLE 2

| Treatment | DCGI (mean) | Grouping |
|---|---|---|
| Formulation 1 - 29% Total Nitrogen (20% slow release nitrogen), 0.5% elemental iron (iron chelated to DTPA) | 0.44275 | A |
| Formulation 2 - 29% Total nitrogen (20% slow release nitrogen formula), 0.5% elemental iron (iron chelated to EDTA) | 0.43525 | B |
| Formulation 3 - 29% Total nitrogen (20% slow release nitrogen formula) | 0.42475 | C |
| Formulation 4 - 29% Total nitrogen (17.3% slow-release nitrogen) | 0.42025 | C |
| Unfed control | 0.40925 | D |

Example 2

Based on the results of Example 1, Formulation 1 was further evaluated to determine how quickly visible improvements would become apparent. In Example 2, Formulation 1 and Formulation 4 were applied to *Poaceae* sp., *Lolium* sp., *Festuca* sp., and *Eremochloa* sp. at a rate of 0.4 lb N/M to determine the amount of greening after 3 days. An unfed control was also evaluated. The results of Example 2 are depicted in Table 3 in the form of DGCI (mean) values. Grouping information was observed using Fisher's least significant difference method for pairwise comparisons. Means separated by different letters are significantly different from one another with $p<0.05$.

As depicted by Table 3, Formulation 1 significantly improved the turf color of all evaluated species.

Example 4

The impact of application method on the turfgrass responses to applications of Formulation 1 were also investigated on *Poaceae* sp in Example 4. In Example 4, two commercial hose-end applicators designed to deliver an 85:1 water-to-product ratio were used to evaluate the importance of hose-end application design including one with a 'fan' application pattern and one with a 'shower' application pattern. An unfed control was also evaluated. The results are depicted in Table 4. Grouping information was observed using Fisher's least significant difference method for pairwise comparisons. Means separated by different letters are significantly different from one another with $p<0.05$.

TABLE 4

| Treatment | Application Device | DGCI (Mean) | Group |
|---|---|---|---|
| Formulation 1 - 29% Total Nitrogen (20% slow release nitrogen), 0.5% elemental iron (iron chelated to DTPA) | Fan Pattern 85:1 Injector | 0.43695 | A |
| Formulation 1 - 29% Total Nitrogen (20% slow release nitrogen), 0.5% elemental iron (iron chelated to DTPA) | Shower Pattern 85:1 Injector | 0.42751 | A |
| Unfed control | n/a | 0.39287 | B |

As illustrated by Table 4, no differences between application devices were observed during this experiment.

Example 5

Turfgrass safety was evaluated when excess fertilizer composition was applied. The safety of excess fertilizer compositions on *Poaceae* sp., *Lolium* sp., *Festuca* sp., *Eremochloa* sp., and *Cynodon* sp was evaluated using Formulation 1 at rates of up to 4 times the contemplated values of approximately 0.4 lb N/M (lbs N/1000 $ft^2$). Injury was assessed as a percentage of leaf tissue with an undesirable appearance within the plot area. The results of Example 5 are depicted in Table 5.

TABLE 3

| | Poaceae | | Lolium | | Festuca | | Eremochloa | |
|---|---|---|---|---|---|---|---|---|
| Treatment | DCGI (mean) | Group | DCGI (mean) | Group | DCGI (mean) | Group | DCGI (mean) | Group |
| Formulation 1 - 29% Total Nitrogen (20% slow release nitrogen), 0.5% elemental iron (iron chelated to DTPA) | 0.35900 | A | 0.77591 | A | 0.38829 | A | 0.37730 | A |
| Formulation 4 - 29% Total nitrogen (17.3% slow-release nitrogen) | 0.35807 | A | 0.75760 | A | 0.36784 | B | 0.36044 | B |
| Unfed control | 0.33881 | B | 071868 | B | 0.36347 | B | 0.37059 | B |

TABLE 5

| Treatment | Rate (lb N/M) | Injury (Mean) | Group |
|---|---|---|---|
| Formulation 1 - 29% Total Nitrogen (20% slow release nitrogen), 0.5% elemental iron (iron chelated to DTPA) | 0.4 | 0 | — |
| Formulation 1 - 29% Total Nitrogen (20% slow release nitrogen), 0.5% elemental iron (iron chelated to DTPA) | 0.8 | 0 | — |
| Formulation 1 - 29% Total Nitrogen (20% slow release nitrogen), 0.5% elemental iron (iron chelated to DTPA) | 1.6 | 0 | — |
| Unfed control | n/a | 0 | — |

As illustrated by Table 5, the use of up to 4 times (1.6 lb N/M) of Formulation 1 did not injure any of the tested turfgrasses.

Example 6

Two additional liquid fertilizer compositions, Formulations 5 and 6, were tested for their spray efficiency after aging in outdoor-like conditions. Both Formulations 5 and 6 contained 67%, by weight, urea ammonium nitrate as a fast-release nitrogen-containing fertilizer, 26.6%, by weight, urea-triazone as a slow-release nitrogen-containing fertilizer, and 0.5%, by weight, iron. In Formulation 5, the iron was chelated to EDTA. In Formulation 6, the iron was chelated to DTPA. For each trial, four 32-oz spray bottles (ready-to-spray type) of each Formulation 5 and 6 were prepared. The bottles were kept at high temperature storage at 104° F. and removed from the chambers at 2, 4, 8 and 12 weeks to check for heat tolerance/compatibility. As can be appreciated, it is known that urea triazone can exhibit precipitation and gelling when returned to ambient temperature after exposure to elevated temperatures for prolonged periods of time. If the time to empty the bottle remains constant both before and after aging, the formulation is robust and stable at the tested temperature for the evaluated period of time.

After these storage periods were complete, the bottles were tested for their spray efficiency, as measured by the time needed to empty the 32 ounce bottle. The removed bottles were stored at room temperature and sprayed all at once with a garden hose at 21 weeks to check for any potential of clogging of dip tube inside the bottles that resulting in longer spray-out time (longer time to empty the bottles). The results are depicted in Table 6 (* means that the trial terminated because the bottle was fully clogged). The results of Table 6 demonstrate that Formulation 6 (iron chelated to DTPA) provided better spray efficiency and was robust even after 12 weeks exposure to high temperature conditions and a further 9 weeks of storage at room temperature. As can be appreciated, this robustness at elevated temperatures can be particularly beneficial in situations where the commercial product is displayed outdoors.

TABLE 6

| Duration @ 104° F. | Duration @ RT | Total duration | Time to empty (Formulation 5) | Time to empty (Formulation 6) |
|---|---|---|---|---|
| 2 weeks | 19 weeks | 21 weeks | ~10 minutes | ~10 minutes |
| 4 weeks | 17 weeks | 21 weeks | ~17 minutes | ~10.5 minutes |
| 8 weeks | 13 weeks | 21 weeks | * | ~10 minutes |
| 12 weeks | 9 weeks | 21 weeks | ~17.5 minutes | ~10 minutes |

The results of Table 3 demonstrate that Formulation 6 (iron chelated to DTPA) provided better spray efficiency and was robust even after 12 weeks exposure to high temperature conditions and a further 9 weeks of storage at room temperature. As can be appreciated, this robustness at elevated temperatures can be particularly beneficial in situations where the commercial product is stored outdoors.

As used herein, all percentages (%) are percent by weight of the total composition, also expressed as weight/weight %, % (w/w), w/w, w/w % or simply %, unless otherwise indicated. Also, as used herein, the terms "wet" refers to relative percentages of the coating composition in a dispersion medium (e.g. water); and "dry" refers to the relative percentages of the dry coating composition prior to the addition of the dispersion medium. In other words, the dry percentages are those present without taking the dispersion medium into account. Wet admixture refers to the coating composition with the dispersion medium added. "Wet weight percentage", or the like, is the weight in a wet mixture; and "dry weight percentage", or the like, is the weight percentage in a dry composition without the dispersion medium. Unless otherwise indicated, percentages (%) used herein are dry weight percentages based on the weight of the total composition.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A liquid fertilizer composition consisting essentially of:
   (a) a slow-release nitrogen-containing fertilizer, wherein the slow-release nitrogen-containing fertilizer is selected from the group consisting of triazone, urea-triazone, isobutylidene-diurea (IBDU), and a combination thereof;
   (b) iron chelated to an aminopolycarboxylic acid or a polycarboxylic acid; and
   (c) optionally water,
   wherein a pH of the liquid fertilizer composition comprises a pH of about 7.5 to about 9.5, and the liquid fertilizer composition does not include potassium.

2. The liquid fertilizer composition of claim 1, wherein the slow-release nitrogen-containing fertilizer comprises urea-triazone.

3. The liquid fertilizer composition of claim 1, comprising iron chelated to an aminopolycarboxylic acid, and wherein the aminopolycarboxylic acid comprises one or more of ethylenediamine tetraacetic acid (EDTA); diethylenetriamine pentaacetic acid (DTPA); N-(2-hydroxyethyl)ethylenediamine triacetic acid (HEDTA); cyclohexane-1,2-diamine tetraacetic acid (CDTA); ethylenediamine-N,N'-bis(o-hydroxyphenylacetic) acid (o,o-EDDHA); ethylenediamine-N-(o-hydroxyphenylacetic)-N'-(p-hydroxyphenylacetic) acid (o,p-EDDHA); ethylenediamine-N,N'-bis(2-hydroxy-4-methylphenylacetic) acid (EDDHMA); ethylenediamine-N,N'-bis(5-carboxy-2-hydroxyphenylacetic) acid (EDDCHA); ethylenediamine-N,N'-bis(2-hydroxy-5-sulfophenylacetic) acid (EDDHSA); N,N'-bis(2-hydroxyphenyl)ethylendiamine-N,N'-diacetic acid (HBED); or ethylenediamine-N,N'-disuccinic acid (EDDS).

4. The liquid fertilizer composition of claim 1, comprising iron chelated to an aminopolycarboxylic acid and wherein the aminopolycarboxylic acid comprises six or more coordination bonds.

5. The liquid fertilizer composition of claim 1, comprising iron chelated to an aminopolycarboxylic acid, and wherein the aminopolycarboxylic acid comprises diethylenetriamine pentaacetic acid (DTPA).

6. The liquid fertilizer composition of claim 1, comprising iron chelated to a polycarboxylic acid and wherein the polycarboxylic acid comprises one or more of citric acid, oxalic acid, succinic acid, malonic acid, or tartaric acid.

7. The liquid fertilizer composition of claim 1, wherein the pH of the liquid fertilizer composition comprises a pH of about 8 to about 9.

8. The liquid fertilizer composition of claim 1, wherein the liquid fertilizer composition is contained in a spray bottle.

9. The liquid fertilizer composition of claim 1, wherein the slow-release nitrogen-containing fertilizer comprises from about 1% to about 99% nitrogen by weight.

10. The liquid fertilizer composition of claim 1, wherein the slow-release nitrogen-containing fertilizer comprises from about 20% to about 70% nitrogen by weight.

11. The liquid fertilizer composition of claim 1 comprises from about 0.1% to about 10% of elemental iron by weight.

12. The liquid fertilizer composition of claim 1 comprises from about 1% to about 40% of the iron chelated to an aminopolycarboxylic acid or polycarboxylic acid by weight.

13. The liquid fertilizer composition of claim 1 further comprises a fast-release nitrogen-containing fertilizer.

14. The liquid fertilizer composition of claim 13, wherein the fast-release nitrogen-containing fertilizer comprises one or more of urea, urea ammonium nitrate, ammonium, or nitrate.

15. The liquid fertilizer composition of claim 13, wherein the fast-release nitrogen-containing fertilizer comprises from about 1% to about 99% nitrogen by weight.

16. The liquid fertilizer composition of claim 13, wherein the fast-release nitrogen-containing fertilizer comprises from about 20% to about 50% nitrogen by weight.

17. A method of fertilizing plants comprising: applying the liquid fertilizer composition of claim 1 to plants.

18. A method of greening turfgrass comprising:
   supplying a liquid fertilizer composition consisting essentially of a slow-release nitrogen-containing fertilizer, wherein the slow-release nitrogen-containing fertilizer is selected from the group consisting of triazone, urea-triazone, isobutylidene-diurea (IBDU), and a combination thereof, iron chelated to an aminopolycarboxylic acid or a polycarboxylic acid, and optionally water, wherein a pH of the liquid fertilizer composition comprises a pH of about 7.5 to about 9.5, and the liquid fertilizer composition does not include potassium; and
   applying the liquid fertilizer composition to turfgrass to cause greening in about 3 days or less; and
   wherein greening is an increase in the dark green color index (DGCI) value of the turfgrass as compared to turfgrass not treated with the liquid fertilizer composition.

19. A liquid fertilizer composition consisting of:
   (a) a slow-release nitrogen-containing fertilizer, wherein the slow-release nitrogen-containing fertilizer is selected from the group consisting of triazone, urea-triazone, isobutylidene-diurea (IBDU), and a combination thereof;
   (b) iron chelated to an aminopolycarboxylic acid or a polycarboxylic acid;
   (c) optionally water; and
   (d) optionally a fast-release nitrogen-containing fertilizer,
   wherein a pH of the liquid fertilizer composition comprises a pH of about 7.5 to about 9.5.

* * * * *